UNITED STATES PATENT OFFICE.

HERMANN PLAUSON, OF HAMBURG, GERMANY.

PROCESS FOR MANUFACTURE OF RUBBER-LIKE SUBSTANCES.

1,415,468. Specification of Letters Patent. Patented May 9, 1922.

No Drawing. Application filed January 13, 1921. Serial No. 437,113.

*To all whom it may concern:*

Be it known that I, HERMANN PLAUSON, Esthonian subject, residing in Hamburg, Germany, have invented certain new and useful Improvements in Processes for Manufacture of Rubber-Like Substances, (for which I have made application in Germany November 1, 1918,) of which the following is a specification.

It is known that the hydrocarbons of the butadiene series such as butadiene, isoprene, piperylene or dimethyl butadiene can be transformed into rubber-like substances by heating in presence or absence of substances assisting polymerization.

It is also known that the polymerization is possible at ordinary temperatures by the aid of certain organic substances, but that according to this process it is necessary to allow the reaction to take place over several months or even years to obtain adequate polymerization to rubber. In manufacturing large quantities of synthetic rubber on a technical scale according to this polymerization process it is necessary to provide extensive storage space and a large number of vessels.

The polymerization takes place much more rapidly on heating, but the yield is too small since almost half the raw materials are transformed on heating at fairly high temperatures into intermediate products or are decomposed and thus lost; further it is difficult to separate these intermediate products from the synthetic rubber while if they are allowed to remain in the mass they cause it to be tacky.

According to the present invention it has been found that butadiene hydrocarbons of all kinds can be transformed into rubber even at ordinary temperatures with a very good yield in a short time even without catalysts if they are subjected at atmospheric temperatures from 15–30° C. for some time to very high pressure. If the known accelerators of the reaction are employed, the time of reaction or the pressure can be materially reduced. At too high pressure especially after a fairly long time of reaction, rubber-like products are obtained which are no longer soluble in the known rubber solvents.

*Example 1.*

100 parts of liquid butadiene are charged into a pressure vessel and nitrogen is then forced in by means of a high pressure compressor up to 300 atmospheres pressure. The vessel is then hermetically closed by means of a valve and allowed to stand for about 4 weeks at atmospheric temperature. After this time the contents of the reaction vessel have been transformed into an almost transparent homogeneous mass which can be excellently worked on rollers into a sheet of rubber. By increasing the pressure to 600 atmospheres the polymerization can be effected in 5–6 days. The pressure must be applied slowly and the mass must be efficiently cooled, e. g., by water.

*Example 2.*

A pressure vessel is charged with 100 parts of isoprene which is cooled to the temperature of liquid ammonia and 3–5 parts of liquid ammonia ($NH_3$) is added to fill the vessel to its neck so that no air space is left whereupon the vessel is tightly closed. After 4–6 weeks standing at room temperature (25–30° C.) the whole mass has become solid owing to the internal pressure. A soft elastic substance is obtained which can be excellently rolled out into a sheet giving a very high quality rubber. Piperylene or mixture thereof with butadiene or isoprene can be polymerized to rubber in the same manner.

*Example 3.*

100 parts of dimethyl butadiene with 100 parts of benzene are charged into a tube of copper or soft steel and one end of the tube is sealed by a blow-pipe flame. The other end is well cooled in a freezing mixture. This end is then pressed flat in a hydraulic press at a pressure of 300 atmospheres or over and the vessel is allowed to stand at ordinary temperature under the pressure. From time to time further pressure must be applied when the internal pressure becomes reduced. After 1 to 2 weeks a gelatinous mass is obtained which after evaporation of the benzene gives an excellent non-tacky rubber. Instead of benzene other organic liquids can be used which do not interact with butadiene hydrocarbons.

*Example 4.*

100 parts of isoprene, 100 parts of dimethyl-butadiene and 200 parts of water containing 1 to 3% of albumen, gelatine, haemoglobin or other emulsifying agents are emulsified and then the emulsion is forced into the piston space of an apparatus like a hydraulic press by means of a pump at 500–600 atmospheres pressure. The mixture itself is employed as the pressure fluid. After the pressure has been raised to the desired height, it is maintained from 5–10 days when the contents are found to be polymerized and the water is removed preferably by distillation in vacuo. In a considerably shorter time than would be possible by the hitherto known polymerization processes, a much better result is obtained as compared with the polymerization of emulsions without pressure. It has further been found that in this case heating to 50° C., does not injure the rubber, and this accelerates the polymerization.

*Example 5.*

50 parts of liquid butadiene and 50 parts of liquid 1.3 dimethyl-butadiene are forced into a pressure vessel with liquid carbon dioxide using a high pressure compressor at a pressure of 60–75 atmospheres. The vessel is allowed to stand for several weeks at about 30° C. when a solid rubber-like substance is obtained which can readily be rolled to a sheet; the mass is however insoluble in benzene. The time of polymerization can be reduced by about a half by addition of 1–3% of ammonia or caustic soda or small quantities from 3–5% of wood oil.

*Example 6.*

The operations described in the previous examples are performed upon 100 parts of the tacky polymerization product of 1.3 dimethyl-butadiene prepared as described by Kondakow in the Journal f. Praktische Chemie, vol. 64, pages 109–110; a pressure of 300–500 atmospheres may be applied during a period of 1 week. After expiration of this time the product is solid and can be calendered to a sheet after previous treatment with alkali and washing with hot water. If Kondakow's product is previously treated with ammonia or acid ammonium carbonate under pressure or with ammonia urea compounds, the process can be accelerated but the product is insoluble in the ordinary rubber solvents.

Having now particularly described and ascertained the nature of my said invention and in what manner the same is to be performed, I declare that what I claim is:—

1. Process of polymerizing hydrocarbons of the butadiene series at temperatures not above normal, by employing high pressures of the order of fifty to six-hundred atmospheres in presence of a diluent.

2. Process of polymerizing hydrocarbons of the butadiene series at temperatures not above normal, by employing high pressures of the order of fifty to six-hundred atmospheres in presence of a fluid diluent.

3. Process of polymerizing hydrocarbons of the butadiene series at temperatures not above normal, by employing high pressures of the order of fifty to six-hundred atmospheres in presence of a liquid diluent.

4. Process of polymerizing hydrocarbons of the butadiene series at temperatures not above normal, by employing high pressures of the order of fifty to six-hundred atmospheres in presence of a volatile liquid diluent.

In witness whereof, I have hereunto signed my name this 30 day of Dec., 1920, in the presence of two subscribing witnesses.

HERMANN PLAUSON.

Witnesses:
 HECTOR ARMSTRONG,
 W. H. BURTON.